United States Patent [19]

Schoettle et al.

[11] 4,225,099
[45] Sep. 30, 1980

[54] TAPE TRANSPORT MECHANISM

[75] Inventors: Klaus Schoettle, Heidelberg; Helmut Lewin, Bobenheim-Roxheim; Werner Hoffmann; Peter Dobler, both of Ludwigshafen; Lothar Gliniorz, Frankenthal, all of Fed. Rep. of Germany

[73] Assignee: BASF Aktiengesellschaft, Lugwigshafen, Fed. Rep. of Germany

[21] Appl. No.: 954,636

[22] Filed: Oct. 25, 1978

[30] Foreign Application Priority Data

Nov. 7, 1977 [DE] Fed. Rep. of Germany ....... 2749735

[51] Int. Cl.³ ............................................ G11B 15/32
[52] U.S. Cl. .................................................. 242/192
[58] Field of Search ............... 242/192, 201, 189, 190, 242/75.51, 75.3, 204

[56] References Cited

U.S. PATENT DOCUMENTS

| | | | |
|---|---|---|---|
| 2,904,275 | 9/1959 | Selsted et al. | 242/75.51 X |
| 3,155,339 | 11/1964 | Groenewegen | 242/75.51 |
| 3,468,497 | 9/1969 | Kelley | 242/192 |
| 4,093,150 | 6/1978 | Burdorf | 242/192 |

*Primary Examiner*—George F. Mautz
*Attorney, Agent, or Firm*—Keil & Witherspoon

[57] ABSTRACT

This invention relates to a tape transport mechanism, particularly an improved contact winding tape transport system modified to protect it against tape transport disturbances occasioned by mechanical impacts. A shock-resisting coupling means is provided which is allocated to the reel carriers and which allows slow movements of the carriers toward and away from a drive capstan during normal working of the mechanism but prevents sudden movements of the carriers induced by mechanical shocks for instance. Piston/cylinder assemblies and magnetic rope/drum arrangements are disclosed as such shock-resisting means. The transport mechanism can be used advantageously in portable apparatus, preferably in magnetic tape recorders and especially in video cameras.

12 Claims, 7 Drawing Figures

TAPE TRANSPORT MECHANISM

The invention relates to a tape transport mechanism, especially a magnetic tape transport mechanism, comprising a drive capstan, take-up and supply reels on reel carriers which are movable relative to said drive capstan and can be urged towards the capstan by pressure means.

Magnetic tape recorders, for example, may comprise a contact-winding tape transport mechanism. If such magnetic tape recorders are employed in, or as, portable units they are subject to shocks which may lead to failures in tape transportation. Failures of this kind may cause recording or reproduction errors or signal failures and may lead to catastrophic operational breakdowns when strong acceleration/deceleration forces are encountered. Such failures may cause the tape or the tape reels to jump out of their guides and/or supports and may render to further use of the transport mechanism impossible.

The various types of known magnetic tape drives have preferred directions of special shock sensitivity. According to U.S. Pat. No. 2,869,799 it is known, in the case of a magnetic tape cassette in which the tape reels are concentrically superimposed on one another, to employ a shock-absorbing device which prevents loop formation and tape stress, especially when sudden quick angular accelerations and decelerations occur in the tape reels. This shock absorber device acts upon both tape reels by a spring force in such a way that, according to given moments of inertia in these reels, the tape remains uniformly tensioned, and transport difficulties are avoided. Employment of a shock absorber device of this type for purposes other than the normal tape transport operation, which is never absolutely constant, is neither mentioned nor suggested. Moreover, other technical factors apply to tape drives using the contact-winding principle. It is in principle known that, the cases of shock-sensitive machines are manufactured from, or surrounded by, shock-absorbing materials (such as integral polyurethane foam, polystyrene foam and/or others). These remedies suffer from the disadvantage of excessive bulk and are therefore not applicable to portable units.

Furthermore, it is generally known to support shock-sensitive devices within the case, especially in their preferred direction of shock sensitivity, by means of shock absorbers, usually rubber-elastic support elements, so that the acceleration acting upon the device are reduced relative to those acting upon the case.

The present invention has for its principal object to provide a tape transport mechanism, especially a magnetic tape transport mechanism, with devices for preventing damage and operating failures due to impact.

According to the invention, there is provided in the case of a contact-winding tape mechanism comprising a drive capstan, take-up and supply reels which, on reel carriers, are movable relative to the drive capstan by pressure means, a shock-resisting coupling means which, while preventing a fast relative movement of the reel carriers, permits slow relative movement of the tape reels under the influence of the pressure means such as is required for transporting the tape from one reel to the other.

The advantage achieved in this way is that the machine parts concerned are directly protected from inadmissible acceleration and deceleration effects, without major expense.

The invention is carried into practical effect by the said means being connected between the two reel carriers.

In this way, the reels themselves are presented from detaching themselves from the capstan, so that loop formation and consequent transport failures are avoided. Also, the maximum bearing force of the reels on the capstan is limited to a tolerable value. This makes it possible to maintain the tape tension at a degree necessary for the reliable functioning of the transport mechanism.

In an advantageous embodiment, the shock-resisting coupling means may be a piston/cylinder assembly containing a pressure medium, the piston and the cylinder being respectively connected to different reel carriers and said pressure medium being suitable for generating, for a slow relative movement of the reel carriers, a low kinetic resistance and for fast relative movements, a larger kinetic resistance.

In this way, a simple construction is achieved in which the most favorable movement-damping characteristic may be selected for any type of tape transport mechanism by a suitable choice of pressure medium and/or piston shape and/or of the tolerances of piston and cylinder.

In another practical embodiment of the invention, the shock-resisting coupling means may be arranged either in parallel or in series with the pressure means and, in particular, in the shape of a piston/cylinder assembly.

Further useful embodiments of the invention are based on the fact that the shock-resisting coupling means is an electro-magnetic rope-and-drum device which may consist, for example, of a rotatably supported rope drum at least partly made of magnetizable material, which is at least partly supported in the field of an electro-magnet. In practice, the drum may be arranged around the plunger of an electromagnetic solenoid in rotatable and lockable manner.

The coupling means may also be a rope/drum device in which the drum is hollow and charged with a synthetic material having suitable flow properties.

The present invention can be used with great advantage for contact-winding tape drives for recording and/or reproducing video signals, especially color video signals. Due to the simple space-saving construction of the shock-resisting devices, it is also possible to incorporate such a device in highly miniaturized form in a video camera, in order to obtain a so-called recorder camera. Another advantage is that the practical embodiments can operate with low electrical power.

In a recorder camera of this type, the contact-winding tape transport consists essentially of a drive capstan and two magnetic tape reels which are arranged on moving carriages or pivoting arms to operate as take-up and/or supply reels and which are urged against the common drive capstan at substantially diametrically opposite points. Drives of this type are characterized by a preferred direction of shock sensitivity in a common imaginary plane, defined by the three vertical rotational axes of the two tape reels and the drive capstan. If a shock acts in this plane radially of the tape reels, all components of the drive are accelerated in the direction of the impact. The mass inertia of the movable pivoting arms which carry the tape reels counteracts this impact such that the tape reel situated behind the capstan when viewed in the direction of the impact is urged more strongly against the capstan (while the effect of the impact lasts), whereas the tape reel situated in front of the capstan is urged less strongly against the latter. If the moment of mass inertia of the frontal tape reel is large, for example because at the time of impact the whole tape supply is largely contained on this tape reel, then, given a corresponding force of impact, the force of the springs providing the contact pressure and linking the pivoting arms is overcome and the tape reel is detached from the capstan. Without the remedy provided by the invention, this usually leads to a serious operating failure if the tape reel detached by the shock effect also happens to be the take-up reel at the same time. As a result of such detachment, the drive of the particular tape reel is briefly interrupted, the tape supplied by the supply reel is accelerated and can no longer be accepted by the take-up reel and jumps off the tape guide, so that the tape will continue to be transported in an uncontrolled fashion even after the termination of the shock action, until the drive is either switched off or jams, owing to the twisting of the tape.

As a result of using the means provided according to the present invention, when a shock affects the machine, advantageously the reel carriers, and especially the pivoting arms are automatically connected positively either by matching-shape or bearing-force engagement such that detachment of one or both tape reels from the capstan is excluded.

Embodiments of tape transport mechanisms in accordance with the invention will now be described, by way of example, with reference to the accompanying drawings, in which.

Figure 3:
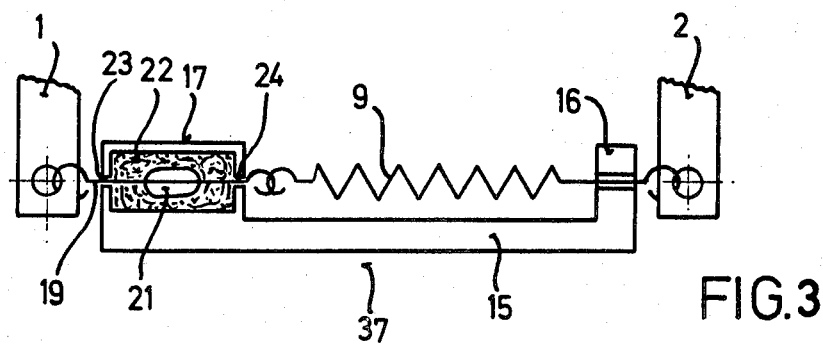
Figure 2:
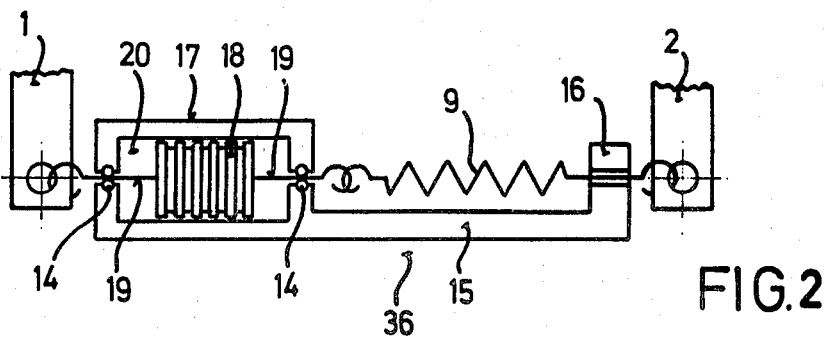
FIG. 2 shows a combination of tension spring and coupling means with a liquid shock absorber.
Figure 4:
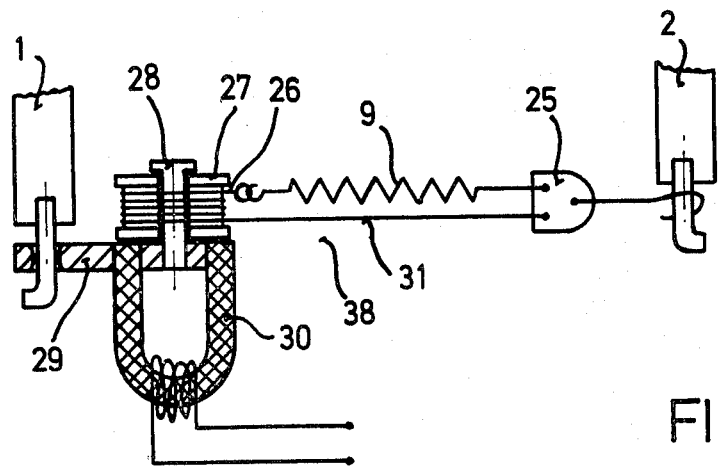
Figure 4A:
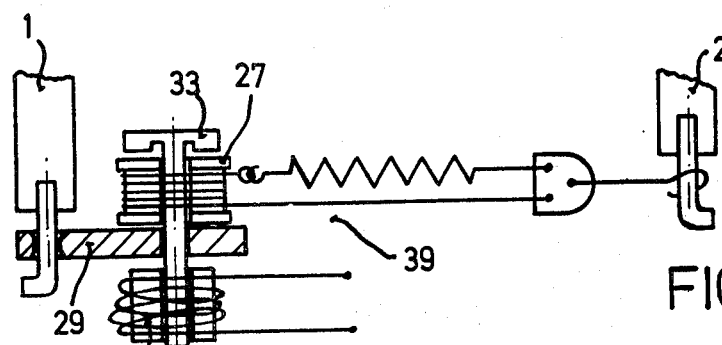

FIG. 3, corresponds to FIG. 2, with a shock absorber of synthetic material;

FIG. 4 shows a coupling means with spring, extension cord, cord pulley and magnetic fixing device for the cord pulley;

FIG. 4a corresponds to FIG. 4, with a solenoid and a cord pulley axle acting as plunger.

Figure 5:
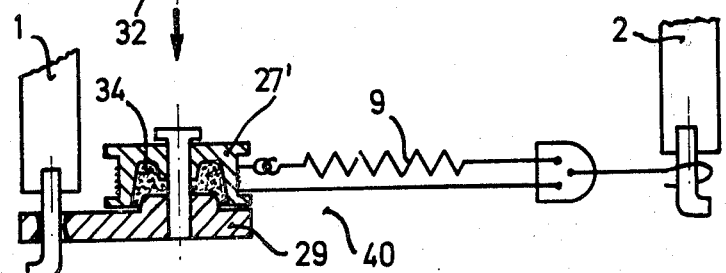

FIG. 5 as corresponds to FIG. 4, in which a rope pulley comprises an annular chamber for a synthetic material.

Figure 6:
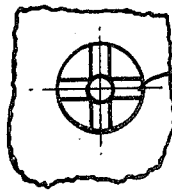

FIG. 6 is a detail in plan of the underside of the annular chamber of FIG. 5.

Figure 1:
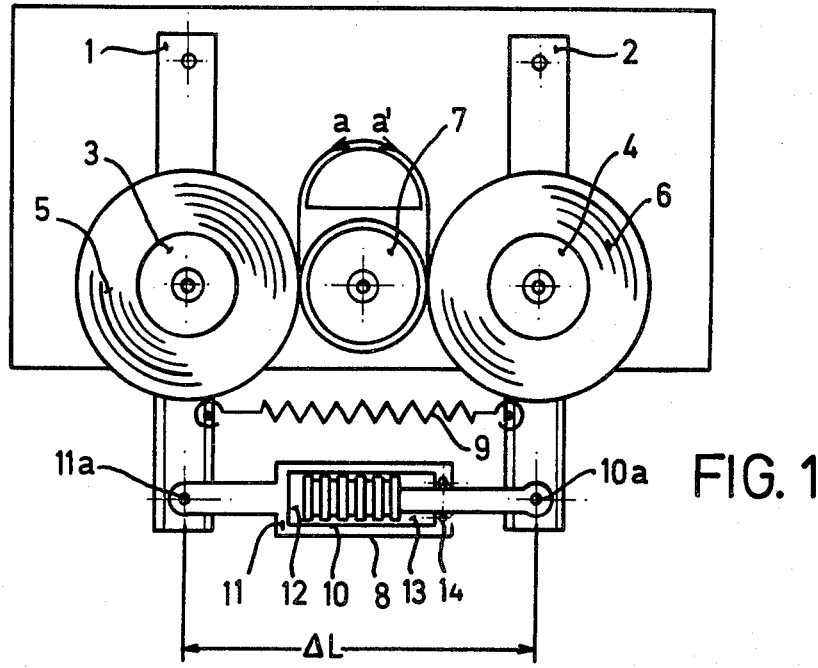
FIG. 1 shows a transport mechanism with capstan, magnetic tape, tension spring and pivoting arm, and therebetween the shock-resisting coupling means.

FIG. 1 shows a contact-winding tape drive mechanism with two pivoting arms 1 and 2, the two rotatable supported reel hubs 3 and 4 and tape reels 5 and 6, wherein a tension spring 9 acts as the pressure means and the shock-resisting coupling means is represented by a device 8.

The spring 9 contracts the pivoting arms 1 and 2, whereby the tape reels 5 and 6 are pressed with their circumferential surface against a central drive capstan 7, the latter being provided with a resistient peripheral surface portion. By means of its two end portions, the coupling locking means 8 is pivotable connected to the pivoting arms 1 and 2 at points 10a and 11a (in this embodiment in parallel with the spring 9). To compensate for the distance variations between points 10a and 11a, caused by the varying tape reel diameters, the coupling means 8 consists essentially of two main parts; a cylinder 11 and a piston 10, displaceable relative to one another. The space within the cylinder not occupied by the piston 10 is filled with a non-compressible medium (pressure medium) which flows from a chamber 12 of the cylinder 11 to a chamber 13 with little resistance and vice versa when the distance $\Delta L$ is varied slowly, the direction of flow depending on whether the distance $\Delta L$ is reduced or increased. The piston 10 is provided on its surface with annular grooves (a so-called labyrinth gasket) if the pressure medium is an easily flowing medium such as commercial hydraulic oil, for example. The piston can seal to the cross-section of the cylinder, but in that case a bypass for the pressure medium to flow between chambers 12 and 13 would have to be provided. In order to prevent liquid leaking from the cylinder chamber 13, the passage of the piston rod through the cylinder casing is provided with a gasket 14. In order to protect the device from bending under pressure (when $\Delta L$ is reduced), the length of the piston 10 is preferably 0.5 to 0.9 times the overall length of the cylinder chamber.

Slow, gradual movements of the piston, such as occur in normal operation of the transport mechanism when the magnetic tape is drawn off the supply reel 5 and fed onto the take-up reel 6 will displace in the chamber 12 only a very small quantity of pressure medium per unit of time which is capable of flowing via the labyrinth gasket of the piston 10 or through a bypass into the chamber 13, even if the pressure gradient is very small.

In the case of an impact, which would normally cause the take-up reel 6, for example, to detach itself briefly from the capstan 7 such detachment is prevented however because, during the very brief duration of the impact only an extremely small volume of pressure medium is allowed to flow from chamber 13 into chamber 12 and an appreciable increase of the distance $\Delta L$ as a consequence of such impact is prevented.

Obviously, other shock absorber devices known in hydraulic engineering could also be used here, for example pistons with an apertured partition or the cylinder bypass already mentioned earlier.

FIG. 2 shows an advantageous space-saving combination of the spring 9 and a coupling means 36 in a series arrangement. A cylinder housing 17, for example containing an oil charge 20, defines one end of a U-shaped frame 15, the other end being an opertured leg 16. One end of the spring 9, which projects through the leg 16, is connected to the pivoting arm 2. The other end of the spring 9 is connected to a piston rod 19 which connects to a piston 18 and passes through both ends of the cylinder housing 17. The other end of the piston rod 19 is connected to the pivoting arm 1. The passages of the piston rod 19 through the cylinder housing 17 are sealed with gaskets 14, in order to prevent the oil charge from leaking out.

This arrangement guarantees that the spring force, in normal operation, acts upon the pivoting arms 1 and 2 in the required manner when the piston 18 executes slow movements, whereas in the case of an impact an effective positive matching-shape connection of the two pivoting arms 1 and 2 is established via the piston 18, the cylinder 17 and the frame 15, which connection automatically disappears when the effect of the impact passes.

FIG. 3 shows an arrangement similar to that of FIG. 2 with a coupling means 37, charged with a synthetic material 22 in place of the oil charge used in the cylinder housing 17, and a piston 21 suitable matched to the flow properties of the charge of synthetic material 22. Any suitable synthetic material which will flow smoothly under slowly acting loads but which will respond with an almost purely elastic reaction even to heavy loads if the duration of impact is short (i.e., <0.1 s) can be used for the charge 22; for example, non-crosslinked homopolybutadiene, advantageously in the form of a mixture of 10% of 1,2-vinyl polybutadiene, 35% of Cu-polybutadiene and 55% of 1,4-trans-polybutadiene. The viscosity of these synthetic materials is so high that special seals at points 23 and 24 of the cylinder housing 17 are not needed. To enable a slow flow of the synthetic material from one end of the piston to the other, the piston 21 has rounded edges and its diameter is only about half the internal diameter of the cylinder housing 17.

FIG. 4 shows another advantageous embodiment of the invention, with a coupling device 38 combined with the spring 9, again in a series arrangement. At one end the spring 9 is movable linked to the pivoting arm 2, via a link element 25 or directly, while the other end of the spring 9 engages a loop of rope 26, e.g. flexible cord, steel wire or plastics thread. The rope 25 is coiled around a drum 27 at least 0.5 to 3.5 times, preferably 1.5 times, and is then taken back to the link element 25 or the pivoting arm 2, there to be fastened. The drum 27 is rotatably mounted on a support 29 by means of a pin 28. The support 29 is movable connected to the pivoting arm 1. An electromagnet, shaped like a horseshoe, for example, is fixed to the support 29 in such a way that when a current passes through the windings of the magnet the latter attracts the drum 27 preferably made of a soft magnetic metal, e.g. low-carbon steel, and prevents further rotation of the drum while the magnetic field is active, whereby a further elongation of the spring is prevented because, owing to the braking of the drum 27 by the magnetic field, the two pivoting arms 1 and 2 are positively locked at a given distance, whereby an increase in the distance ΔL is prevented. By using a shock-sensitive sensor element (not shown) e.g. a piezoelectric crystal the magnetic field can be switched on only for the duration of the impact.

FIG. 4a shows an arrangement similar to FIG. 4, the coupling means 38 consisting in this case of a solenoid 32 and a plunger 33 serving as the spindle for the drum 27. When current passes through the coil 32, the plunger 33 is pulled down in the direction of the arrow, due to the magnetic field produced in the core of the coil. The drum 27 is thereby clamped firmly between the saucer-shaped end portion of the plunger 33 and the support 29. This presents the drum 27 from rotating.

As can be seen from FIGS. 5 and 6, the restraining force on the drum 27 (obtained magnetically as described in FIGS. 4 and 4a) can also be generated by means of a charge of synthetic material acting as a pressure medium in the manner described in the embodiment of FIG. 3. Here, the drum 27' of an assembly 40 is provided with an (e.g. annular) cavity 34 which is completely filled with synthetic material. Thus, slow rotation of drum 27' is possible due to the flow properties of the synthetic material. When an impact occurs, the drum 27', due to friction of the synthetic material against the walls of the annular cavity 34, is prevented from rotating and the pivoting arms 1 and 2 are locked relative to one another. To increase the friction drag of the synthetic material within the cavity 54, radial grooves may be provided at the bottom of support 29 and within the cavity 34 of the drum 27', as shown in FIG. 6. These grooves prevent the synthetic material from sliding easily on the wall portions.

In the embodiments of the invention discussed here the fact is exploited that, given a drive of appropriate design, the distance between the two tape reel spindles varies only slightly while the magnetic tape is fully transferred from one reel to the other. In a drive of practical design, with a capstan diameter of 20 millimeters, a reel hub diameter of 30 millimeters, a tape length of approximately 180 m and a tape thickness of $8.5 \times 10^{-3}$ millimeters, the maximum variation of distance is 1.6 millimeters and is at its maximum when an equal amount of tape is present on both tape reels.

Provided that the above-described embodiment of anti-shock devices are properly adapted they are applicable also in contact-winding tape transport mechanisms in which carriages act as reel carriers, allowing the same advantages to be obtained.

A tape drive comprising pivoting arms was tested and optimized by the use of devices of the kind described here, it being found that it could withstand an impact corresponding to a momentary acceleration of 40 to 50 g without disturbance or damage.

Further embodiments of the invention can easily be carried out within the scope of the appendant claims by those skilled in the art.

We claim:

1. A tape transport apparatus comprising:
   a drive capstan,
   take-up and supply reels rotatably supported on respective reel carriers,
   two mounting means which mount the respective reel carriers for movement relatively to said capstan, and
   a combination of pressure means and mechanical shock actuated coupling means, so connected between said two mounting means that said pressure means are normally effective to yieldingly urge said mounting means toward each other and hence said reels toward said capstan,
   said coupling means being responsive to exposure to said apparatus to mechanical shock for rendering the connection between said mounting means relatively unyielding.

2. A tape transport apparatus as claimed in claim 1, wherein said coupling means comprises a piston-cylinder assembly containing a pressure medium, said pressure medium presenting a low kinetic resistance to relatively slow movement of said piston with respect to said cylinder and presenting a high kinetic resistance to relatively fast movement of said piston with respect to said cylinder.

3. A tape transport apparatus as claimed in claim 2, wherein the piston is provided with annular grooves in the form of a labyrinth gasket.

4. A tape transport apparatus as claimed in claim 1 or 2, wherein the coupling means is arranged between the reel carriers in parallel with the pressure means.

5. A tape transport apparatus as claimed in claim 1 or 2, wherein the coupling means is arranged between the reel carriers in series with the pressure means.

6. A tape transport apparatus as claimed in claim 2, wherein the piston-cylinder assembly contains a synthetic pressure medium of the type having the property of flowing readily under the influence of slow-acting forces but responding elastically to the application of fast-acting forces.

7. A tape transport apparatus as claimed in claim 1, wherein said apparatus comprises a shock-sensitive sensor element and wherein said coupling means includes a rope-drum device and electromagnetic means for preventing the rotation of said device, said electromagnetic means being controlled by said sensor element.

8. A tape transport apparatus as claimed in claim 7, wherein said electromagnetic means is an electromagnet and wherein said rope drum device has a rotatably supported drum which is at least partly situated within the magnetic field of said electromagnet.

9. A tape transport apparatus as claimed in claim 7, wherein said electromagnetic means is a solenoid having an axially movable plunger and wherein said rope drum device has a drum which is of at least partly magnetizable metal and is supported for rotation around said axially movable plunger.

10. A tape transport apparatus as claimed in claim 1, wherein said coupling means includes a rope drum device having an at least partly hollow drum containing a charge of synthetic material of the type having the property of flowing readily under the influence of slow acting forces but responding elastically to the application of fast acting forces.

11. A magnetic tape transport apparatus comprising:
a drive capstan,
take-up and supply reels rotatably supported on respective reel carriers,
two mounting means which mount the respective reel carriers for movement relatively to said capstan, and
a combination of pressure means and mechanical shock actuated coupling means, so connected between said two mounting means that said pressure means are normally effective to yieldingly urge said mounting means toward each other and hence said reels toward said capstan,
said coupling means being responsive to exposure of said apparatus to mechanical shock for rendering the connection between said mounting means relatively unyielding so that the movement of the two reel carriers incident to said shock is limited and synchronized.

12. A magnetic tape transport apparatus forming part of a video camera, said apparatus comprising:
a drive capstan,
take-up and supply reels rotatably supported on respective reel carriers,
two mounting means which mount the respective reel carriers for movement relatively to said capstan, and
a combination of pressure means and mechanical shock actuated coupling means, so connected between said two mounting means that said pressure means are normally effective to yieldingly urge said mounting means toward each other and hence said reels toward said capstain,
said coupling means being responsive to exposure of said apparatus to mechanical shock for rendering the connection between said mounting means relatively unyielding so that, incident to said shock, detachment of the reels from the capstan is obviated and contact pressure forces of the reels on the capstan are kept within limits.

* * * * *